United States Patent Office 2,851,105
Patented Sept. 9, 1958

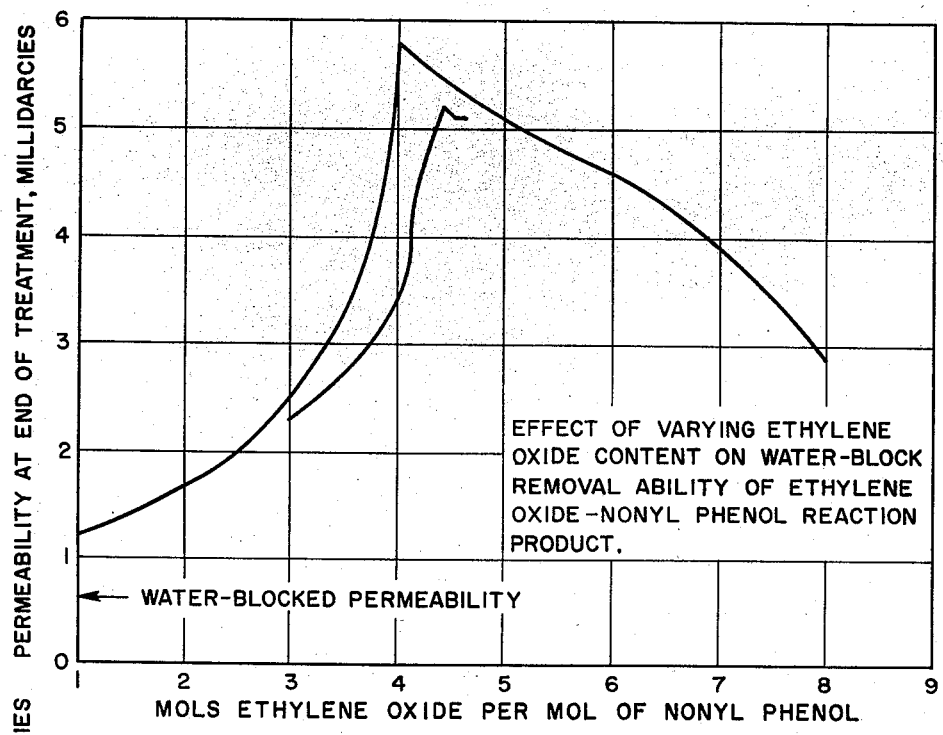
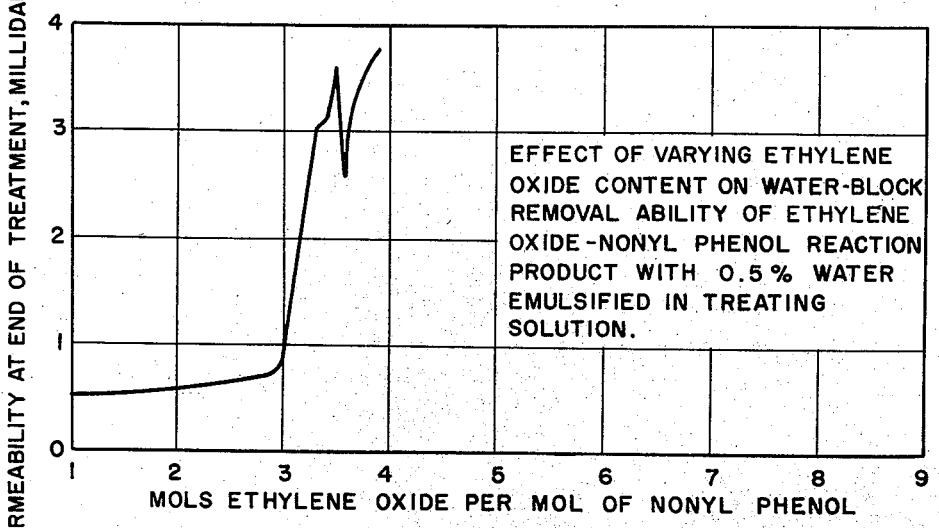

2,851,105

METHOD FOR REMOVING WATER FROM OIL SANDS

Arthur W. Garst, Tulsa, Okla., assignor to Pan American Petroleum Corporation, a corporation of Delaware Application October 31, 1956, Serial No. 619,491

15 Claims. (Cl. 166—42)

This invention relates to treating oil-bearing or gas-producing formations penetrated by wells. More particularly, it relates to removing water from such formations in the zone extending the first few feet from a well which penetrates a formation.

This application is a continuation-in-part of my co-pending U. S. patent application S. N. 428,823, filed May 10, 1954, now U. S. Patent 2,779,418. The parent application teaches removal of water blocks from oil-bearing formations by injecting into such formations oil solutions of oil-soluble surface active agents capable of decreasing the interfacial tension between water and oil to below about 2 dynes per centimeter when present in the oil in a concentration of from about 0.1 to about 0.5 percent. The most outstanding group of materials disclosed is the group made up of certain sorbitol derivatives. These materials are very complex, are difficult to prepare and are somewhat expensive. Attempts to prepare satisfactory similar compounds which are more easily manufactured and are much less expensive have not been too successful. For example, if pure nonyl phenol is reacted with pure tetraethylene glycol to form a surface active agent this material is found to give only a limited decrease in interfacial tension and is not particularly effective in removing blocking water from oil producing formations. It would be desirable to discover a simpler, less expensive surface active agent substantially as effective as the more complex sorbitol derivatives.

Another problem which has arisen in connection with the sorbitol derivatives is their sensitivity to water. As pointed out in the parent application, a little water mixed with the sorbitol derivative seems to form hydrates with the derivatives to decrease the interfacial tension between oil and water. If the sorbitol derivatives are thoroughly mixed with too much water, however, the degree of hydration can progress too far. The result is a decrease in the waterblock removing ability of the sorbitol derivatives. In most cases the amount of water or degree of mixing is insufficient to affect seriously the waterblock removing ability of the sorbitol derivatives. This fact has been established by field experience. In many cases, however, the degree of hydration has probably proceeded too far, greatly decreasing or even preventing effective waterblock removal in field operations. Obviously, it would be highly desirable to provide a waterblock removal agent which would not be so greatly affected by water which may be in the oil used as a solvent or in the bottom of the well being treated.

An object of this invention is to provide a simple, inexpensive agent having waterblock removal ability substantially the same as or better than that of the sorbitol derivatives. A more specific object is to provide a simple, inexpensive waterblock removal agent and method for its use in which the effects of hydration by water are small or can be avoided.

I have found that the objects of my invention can be accomplished by use of a surface active agent which is a mixture of molecules or compounds having the general formula RLW. In this formula R is the oil-soluble portion, W is the water-soluble portion, and L is a connecting link or nucleus. For my purposes R is a hydrocarbon radical. The radical may be of the alkylated aromatic or aralkyl type such as the nonyl benzene radical, or it may be of the aliphatic type such as the octadecane radical. It may be saturated or unsaturated. The group should contain at least about 12 carbon atoms to afford sufficient oil solubility for my purposes. Preferably, the group should contain not much more than about 20 carbon atoms. The class of surface active agents can also be expressed by the formula $RL(CH_2CH_2O)_nH$ in which $n$ is an integer.

The water-soluble portion, W, is a polyoxyethylene radical such as $—OCH_2CH_2OCH_2CH_2OH$. Any one molecule of the surface active agent must, of course, have a polyoxyethylene radical containing a definite number of oxyethylene groups ($—OCH_2CH_2—$). That is, $n$ in the alternative formula must be an integer. The surface active agent to be effective for my purposes, however, must contain a mixture of molecules having polyoxyethylene radicals of different lengths. The mixture should contain some molecules having radicals with as little as 2 oxyethylene groups and some having as much as 6 such groups. Preferably, not more than about 20 percent of the molecules should contain polyoxyethylene radicals having more than about 6 oxyethylene groups. The average length of the radical should be between about 3.2 and about 4.5 oxyethylene groups. If the average radical length is too short the surface active agent is too oil-soluble and will not produce the required reduction in interfacial tension between oil and water, as specified in the parent application. If the average radical length is too great the surface active agent becomes too water-soluble and tends to form hydrates and oil-in-water emulsions which adversely affect the ability of the agent to increase the permeability of water blocked formations.

In the formula RLW, the connecting link or nucleus L is either an ester linkage

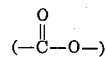

or an ether linkage (—O—). This linkage is normally provided by the oil-soluble organic chemical containing the hydrocarbon radical. Thus, if the hydrocarbon is to be the nonyl benzene radical and the linkage is to be an ether linkage, both the hydrocarbon radical and the connecting link are provided by nonyl-phenol. If the hydrocarbon radical is to be a heptadecene radical and the connecting link is to be an ester linkage, both the hydrocarbon radical and linkage may be provided by oleic acid. If desired, the mixture of molecules can be further diversified by using mixtures of acids, alcohols, alkylated phenols and the like, to provide a mixture of different lengths and types of hydrocarbon radicals as well as a variety of connecting links.

The surface active mixtures of compounds just described are simple, inexpensive materials which can be easily prepared by reacting an acid such as oleic acid or an alkylated phenol such as nonyl phenol with about 3.2 to about 4.5 mols of ethylene oxide per mol of acid or alkylated phenol. The result of such an oxyethylation is a random distribution of lengths of polyoxyethylene radicals attached to the various acid or alkylated phenol molecules. The materials can be prepared by first manufacturing a mixture of polyethylene glycol molecules and then forming the esters or ethers of these materials with the appropriate acids or alkylated phenols. The direct oxyethylation of the acids or alcohols with ethylene oxide is simpler, less expensive and more desirable, however.

Suitable solvents for my waterblock removal agent include hydrocarbon oils such as crude petroleum or fractions thereof, animal oils such as whale oil, and vegetable oils such as cottonseed oil. Other suitable carrier liquids include water solvents such as the lower alcohols or ketones, for example, methanol or acetone or other water solvents such as pyridine. Paraffin solvents such as benzene or carbon tetrachloride may also be employed as solvents for the waterblock removal agent. The carrier liquids may be non-viscous or they may be naturally viscous or artifically thickened or gelled. A more detailed description of such solvents and their advantages is to be found in my co-pending application, S. N. 428,-823, now U. S. Patent 2,779,418.

The lower concentration limit is the same as that suggested in my co-pending application, S. N. 428,823, now U. S. Patent 2,779,418. That is, the treating solution in the formation should contain a minimum concentration of at least about 0.1 percent by weight of the surface active agent. To allow for dilution, a concentration of at least about 0.2 percent should be employed in the solution injected into the well. An advantage of the type of surface active agent which I have described is the possibility of using high concentrations of such agents without forming stable emulsions which tend to block the formation. In the laboratory, solutions of oxyethylated nonyl phenol obtained by reacting one mol of nonyl phenol with about 4 mols of ethylene oxide have been employed many times with good results when containing 2 percent by weight of the surface active agent. In some cases the concentration of this surface active agent has been even higher without causing any apparent emulsion plugging of the formation. In one case a 5 percent solution of the reaction product of one mol of nonyl phenol with about 5 mols of ethylene oxide was used. This was an extreme case since the emulsifying tendency of this material is greater than that of agents in my range as defined above. The solvent was a petroleum fraction containing predominantly hydrocarbons having from 10 to 12 carbon atoms per molecule. The entire 5 percent of surface active agent did not go into solution in this particular solvent but still no serious emulsification difficulty was encountered. In a continuation of the same test pure surface active agent containing 5 mols ethylene oxide per mol of nonyl phenol was injected into the core without difficulty. The surface active agents having average polyoxyethylene radical lengths in the range of 3.2 to 4.5 oxyethylene groups have very little emulsifying ability at all. Thus, they can be used in concentrations as high as desired. Only economic considerations control the concentration to be employed. For best results, however, the treating solution should contain mostly solvent.

In use, the treatment may be remedial after water has entered the formation or it may be preventive in anticipation of water entering the formation. The quantity of solution used in either case can be as low as about 500 gallons or as high as about 20,000 gallons or even higher in some cases. In general, the amount of solution should be about 40 gallons per foot of exposed oil-bearing formation. The amount may be somewhat lower or may run as high as about 500 gallons per foot in extreme cases. The rate of injection should be high if the water is to be forced back away from the well. It should be low if the purpose is to cause the water to flow out of the formation into the well. A flush of oil may follow the solution into the formation if desired. If used for preventive purposes, the treating solution can be injected into the formation ahead of water. The water may be introduced intentionally to acidize the formation, dissolve salt crystals, adjust wettability of the formation, run permeability profiles, or the like. Entry of the water into the formation from the well may also be unintentional but unavoidable as in cleanout or workover operations or when an oil well making considerable water is shut in by order of governmental regulatory bodies. The treatment may also be used in combination with fracturing operations in which the waterblock removal treatment precedes or follows the fracturing operation, or in which the surface active agent is added directly to the oil used for fracturing. All these methods of use are described in more detail in my co-pending application S. N. 428,-823, now U. S. Patent 2,779,418.

As previously noted, water in the crude oil normally used as a solvent has adverse effects on some waterblock removal agents. The effect of water on the class of surface active agents which I have defined above is noticeable but not severe as long as certain limitations are observed. For example, in one test, an oil solution of my surface active agent remained highly effective even though the oil contained 0.5 percent water. Under the same conditions the sorbitol derivatives lose much of their effectiveness, apparently due to excessive hydration of the surface active agents.

The degree of hydration of my class of agents depends upon the length of the polyoxyethylene radical. For example, if one mol of nonyl phenol is reacted with 3.5 mols of ethylene oxide the resulting product will absorb about 20 percent water. That is, one pound of the product will absorb about 0.2 pound of water. Additional water will cause a cloudy or opaque solution due, apparently, to the presence of free water. If one mol of nonyl phenol is reacted with 4.0 mols of ethylene oxide, the resulting product will absorb about 40 percent water, 0.4 pound water per pound of the reaction product.

The effect of the water of hydration is much the same as if the polyoxyethylene radical had been lengthened by the addition of more ethylene oxide. Thus, while the optimum average polyoxyethylene length for use with a water-free oil solvent is about 4.2 to about 4.4 oxyethylene groups, the optimum for use with a solvent containing water is only about 3.3 to about 3.9 or less. In field operations the water content of the oil solvent may not be accurately known. Therefore, for best results it is advisable to add a little water to the oil and use a surface active agent of the type defined above in which the molecules have polyoxyethylene radicals containing an average of from about 3.2 to about 4.0 oxyethylene groups. The amount of water added should be at least about 20 percent of the weight of the surface active agent to insure a good degree of hydration. Additional water will usually not be harmful since most oils used as solvents can easily carry at least 1 or 2 percent water in suspension. This is particularly true if the oils have a high viscosity. Once the surface active agent is hydrated, additional water does little harm so long as sufficient oil is present to prevent formation of a gelatinous dispersion of the free water in the surface active agent. The solvent, for this purpose, should amount to at least about 20 percent of the volume of the surface active agent. That is, if excess water is to be present, 20 volumes of the solvent should be present for each 100 volumes of the surface active agent. The problem of excess water does not normally arise in field operations since the preferred treating solution contains only about 0.2 to about 10 percent by volume of surface active agent, from about 0.1 to about 2 percent of added water, depending on the concentration of surface active agent, and the remainder solvent.

In order to avoid the trouble of mixing water into the treating solution in the field it may be desirable to prepare an agent containing water and a little solvent. The amount of water should be between about 10 percent and about 30 percent by weight of the surface active agent, 10 to 30 parts water to 100 parts surface active agent. The lower limit is imposed to insure at least partial hydration. The upper limit should be observed to avoid excessive tendencies to form gels. The amount of solvent should be between about 10 percent and about 100 percent of the volume of the surface active agent, 10 to 100 parts by volume solvent to 100 parts surface active agent. The minimum limit is imposed to insure adequate wetting of the oil-soluble end of the surface active agent and to decrease the viscosity and gel forming tendency of the hydrated surface active agent. The upper limit should be observed principally for economic reasons and to avoid shipping, storing, and handling too much inert solvent. In general, the solvent may be any liquid previously described for this purpose. However, for specific use in forming a treating agent containing water and a little solvent, the solvent should be one having a low viscosity. In addition it should be inexpensive and non-flammable. For these purposes a petroleum fraction such as kerosene, having a high flash and fire point is preferred. For use in preparing a treating agent containing water and solvent the surface active agent should have an average polyoxyethylene radical length in the range between about 3.2 and 4.0 oxyethylene groups. The water-containing and solvent-containing treating agent just described remains liquid and easily pourable over a wide temperature range from about −20° F. to above 100° F. At elevated temperatures preparations containing near the maximum amount of water may become cloudy due to liberation of free water, but the effectiveness of the agent is not impaired. The proposed water-containing, solvent-containing agent can be used with confidence in the field since optimum effectiveness is assured by the presence of water in the agent even if the crude oil or other solvent contains little or no water. On the other hand, even a percent or two of water sometimes present in some crude oils will cause no change in effectiveness of the agent since it is already hydrated and changes little on addition of more water.

If a treating solution is used containing a surface active agent in which the mixed molecules have an average polyoxyethylene radical length near the upper limit of about 4.5 ethylene oxide groups, it is generally advisable to insure against any possible detrimental effects of hydration. This can be done by use of a second treating solution. This second solution should contain a surface active agent containing a short average polyoxyethylene radical length. Then if hydration makes the first surface active agent too water soluble so it has a slight tendency to form an oil-water emulsion, the second surface active agent, being more oil-soluble, tends to neutralize this emulsion forming tendency and bring the average size of the water-soluble portions of the molecules back into the desired range. Either of the two solutions can be injected into the formation first.

If the more oil-soluble surface active agent solution is used as insurance against hydration difficulties it is possible to raise the average polyoxyethylene radical length of the more water-soluble agent to about 5.0 ethylene oxide groups. Advantage can be taken in this way of the greater interfacial tension reducing ability of the more water-soluble material. In such a case, however, the concentration of the more water-soluble material should not exceed about 1 percent by weight of the treating solution to avoid the possibility of forming oil-in-water emulsions which might block smaller pores to such a degree that they could not be reached by the more oil-soluble agent.

The average length of the polyoxyethylene radicals in the more oil-soluble surface active agent molecules should be at least about 2.0 and preferably at least about 2.5 ethylene oxide groups. This is to insure enough surface activity to cause the agent to become concentrated at oil-water interfaces rather than remaining substantially entirely dissolved in the oil solvent. The quantity of the more oil-soluble agent should preferably be sufficient to produce an average polyoxyethylene radical length of between 3.2 and about 4.0 and preferably about 3.5. This should be the average for all the molecules in both the more water-soluble and the more oil-soluble agents. It will be apparent, however, that many of the advantages of using the two treating solutions will be retained if they are used in ratios falling outside the ratio specified above.

The more oil-soluble agent can be introduced in a solution having any desired concentration above about 0.2 percent by weight, but preferably containing a major portion of the solvent.

The surface active agents must, of course, be different to obtain the benefits of the two solution treatment. For best results, the two surface active agents should be widely different. If desired, however, the polyoxyethylene radicals in the molecules of the more water soluble agent may have an average length of as low as 3.5 oxyethylene groups. The average polyoxyethylene radical length in the molecules of the more oil-soluble agent may be as high as 3.5 oxyethylene groups.

My invention will be better understood by reference to the following examples:

EXAMPLE I

To determine the water removing abilities of nonyl phenol oxyethylated with various amounts of ethylene oxide, apparatus was assembled and flow tests were run as follows: A core about 1-inch long and ¾-inch in diameter was mounted in a rubber stopper which was in turn mounted in a Lucite sleeve. This sleeve had connections permitting forcing a liquid through the core under a pressure differential of about 1 atmosphere. The core was from the Springer sand and was obtained from a well in the Velma field in Oklahoma. The large core from the well was drilled with oil base drilling fluid and was shipped and stored in oil until used. The small test core was drilled from the large core using kerosene as a drilling fluid. The test core was then flushed with a narrow boiling petroleum fraction containing predominantly hydrocarbons having from 10 to 12 carbon atoms per molecule. This narrow boiling fraction will be referred to hereinafter as a $C_{10}$–$C_{12}$ fraction. The core was used first in testing the water removing abilities of various substances other than nonyl phenol derivatives. At the beginning of the tests of the nonyl phenol derivatives, the permeability to flow of the $C_{10}$–$C_{12}$ fraction was 9.9 millidarcys. The core was then water blocked with a brine containing about 96,000 p. p. m. by weight of sodium chloride, 9,000 p. p. m. calcium chloride, and 3,000 p. p. m. magnesium chloride. After being water blocked, the core had a permeability to flow of the $C_{10}$–$C_{12}$ fraction of only 0.6 millidarcy. Solutions of nonyl phenol derivatives in the $C_{10}$–$C_{12}$ fraction were then forced through the core in sequence. About 10 pore volumes of one solution was forced through, followed immediately by about 10 pore volumes of the next solution to be tested. No flushing and re-blocking was used between tests. In every case the concentration of the nonyl phenol derivative in the $C_{10}$–$C_{12}$ fraction was 1 percent by weight. Testing began with nonyl phenol reacted with 1 mol of ethylene oxide per mol of nonyl phenol. This was followed by nonyl phenol reacted with 2 mols of ethylene oxide, etc., each nonyl phenol derivative containing more ethylene oxide than the preceding material tested. The results are presented in Table I and are shown in the upper curve in Figure 1. Also presented in Table I are interfacial tensions between the brine described above and solutions of the nonyl phenol derivatives in the $C_{10}$–$C_{12}$ fraction.

*Table I*

| Mols Ethylene Oxide per Mol Nonyl Phenol | Interfacial Tension, dynes/cm. at the Concentration Indicated | | | Permeability of Core, md. After Treatment |
|---|---|---|---|---|
| | 0.1% | 0.5% | 1.0% | |
| 1 | 32.3 | 21.5 | 15.5 | 1.2 |
| 2 | 20.8 | 9.2 | 5.0 | 1.7 |
| 3 | 20.5 | 8.7 | 4.0 | 2.5 |
| 4 | 4.1 | 0.1 | 0.05 | 5.8 |
| 5 | 2.3 | 0.05 | 0.05 | 5.1 |
| 6 | 0.5 | 0.05 | 0.05 | 4.6 |
| 8 | 1.4 | 0.4 | 0.05 | 2.9 |

The testing procedure was repeated using treating solutions containing nonyl phenol reacted with amounts of ethylene oxide intermediate between the quantities used to prepare the agents previously tested. The results are presented in Table II and are shown in the lower curve of Figure 1.

Table II

| Mols Ethylene Oxide per Mol Nonyl Phenol | Permeability of Core, md. After Treatment |
| --- | --- |
| 3 | 2.8 |
| 3.75 | 3.0 |
| 4.0 | 3.5 |
| 4.1 | 3.8 |
| 4.2 | 4.7 |
| 4.3 | 4.9 |
| 4.4 | 5.2 |
| 4.5 | 5.1 |
| 4.6 | 5.1 |

The fact that the permeability was not quite as good after treatment in this case was probably due to some residual plugging effects of the water soluble agents used in the preceding test.

In the upper curve of Figure 1 it will be noted that even the nonyl phenol reacted with only 1 mol of ethylene oxide produced a small increase in permeability of the water blocked core. Nonyl phenol containing increased amounts of ethylene oxide produced even higher permeabilities until a distinct peak in permeability was produced by nonyl phenol reacted with about 4 mols of ethylene oxide. The lower curve shows the optimum average polyoxyethylene radical length in more detail. The results of the test using nonyl phenol reacted with 5 mols of ethylene oxide as shown in the upper curve is particularly significant. This agent was introduced into the core immediately following the nearly optimum agent containing 4 mols of ethylene oxide. Since this agent had removed most of the water from the core, it would certainly be expected that subsequent agents should at least maintain the core permeability established by the nearly optimum agent. As shown in Figure 1, however, the agent containing 5 mols ethylene oxide per mol of nonyl phenol actually caused a decrease in core permeability. The explanation is not certain. It may be due to the presence of more water-soluble molecules in the reaction product containing more ethylene oxide. Some of these molecules may contain so much ethylene oxide that they cause some emulsification of oil droplets in water. This emulsion may produce some plugging action. Another possible explanation of the observed plugging action is the tendency of the reaction products to hydrate. Hydration increases rapidly with increased amounts of ethylene oxide until some of the hydrates become very thick gels or pastes in the absence of oil. Formation of such gels in water-filled pores of the formation might account for some decreased permeability of the formation, although this seems unlikely in the presence of large amounts of oil.

The high interfacial tensions produced by nonyl phenol reacted with 1 or 2 mols of ethylene oxide explains the low effectiveness of these materials. Only with high concentrations of the reaction product with 3 mols ethylene oxide is the interfacial tension reduced to reasonably low values. Fortunately, high concentrations can be tolerated of the reaction products of 1 mol of nonyl phenol with less than about 4.5 mols of ethylene oxide. Therefore, by using at least about 1 percent of the reaction product of nonyl phenol with at least about 3.2 mols of ethylene oxide it is possible to produce an interfacial tension sufficiently low to cause a considerable increase in permeability. Hydration of such a reaction product with a little water makes the product more like one containing an increased amount of ethylene oxide. Therefore, if adequate opportunity for hydration is available even lower concentrations of the reaction product of 1 mol of nonyl phenol with 3.2 mols of ethylene oxide will produce desirable interfacial tension lowering. From Table I it will be apparent that nonyl phenol reacted with 5 mols ethylene oxide is more effective in decreasing interfacial tension than nonyl phenol reacted with 4 mols ethylene oxide. However, the 5 mol product apparently contains so much water-soluble reaction product that it is relatively undesirable as a waterblock removal agent.

EXAMPLE II

The results shown in Table I were checked using the same test equipment, brine, and treating solutions described in Example I. In this case, however, the testing method was changed so that the core was flushed with the $C_{10}$–$C_{12}$ fraction after each test and was reblocked with brine before testing the next agent. The results of the test were quite similar to those shown in Table I. The peak results were produced using the product of 4 mols of ethylene oxide and 1 mol of nonyl phenol. The reaction product using 5 mols of ethylene oxide per mol of nonyl phenol removed considerable water and produced an increased permeability. Thus, in spite of the plugging tendency shown in Figure 1, it is apparent that the 5 mol ethylene oxide reaction product with 1 mol nonyl phenol has some ability to increase permeability in badly water blocked formations.

EXAMPLE III

To determine the effects of changing the salinity of the blocking water, the treating apparatus and procedures described in Example I were used except that the brine was diluted until it contained only 3,500 p. p. m. total salts. The results are presented in Table III.

Table III

| Mols Ethylene Oxide per Mol Nonyl Phenol | Permeability of Core, md. After Treatment |
| --- | --- |
| Before Treatment | 1.0 |
| 1 | 0.8 |
| 2 | 1.8 |
| 3 | 1.9 |
| 4 | 4.2 |
| 5 | 4.2 |
| 6 | 3.2 |
| After $C_{10}$–$C_{12}$ flush | 6.9 |

The data in Table III demonstrate the effectiveness of the oxyethylated nonyl phenol to remove water blocks formed by low salinity brines. The data also show that again best results are obtained when the treating agent contains about 4 mols of ethylene oxide per mol of nonyl phenol.

EXAMPLE IV

The test described in Example I was repeated employing the methods and apparatus used therein. In this case, however, a little fresh water, 0.5 percent by volume of the treating solution was added to the treating solution to cause hydration of the treating agent. The results of the tests are presented in Table IV and are shown in Figure 2.

Table IV

| Mols Ethylene Oxide per Mol Nonyl Phenol | Permeability of Core, md. After Treatment |
|---|---|
| 1.0 | 0.5 |
| 2.0 | 0.6 |
| 3.0 | 0.8 |
| 3.1 | 1.5 |
| 3.2 | 2.1 |
| 3.3 | 3.0 |
| 3.4 | 3.1 |
| 3.5 | 3.6 |
| 3.6 | 2.6 |
| 3.7 | 3.5 |
| 3.8 | 3.7 |
| 3.9 | 3.8 |

The reason for the break in the curve shown in Figure 2 is not known. It is probably due to the interaction of the various complex functions of the treatment. That is, while higher ethylene oxide content produces lower interfacial tension between water and oil to provide greater water removing ability, the emulsion forming tendency is increased as well as the tendency to form hydrates. Both of the latter effects tend to decrease the water removing ability of the agent. The shape of the curve in Figure 2 probably simply reflects the predominance of any one group of tendencies over the others in a particular range of ethylene oxide content of the treating agent. The treatment was stopped at approximately the top of the peak to avoid any possible plugging tendencies of the more water-soluble agents.

A test was also run using a treating solution of 1 percent Atpet 931 in the $C_{10}$–$C_{12}$ fraction containing 0.5 percent fresh water. Atpet 931 is the alcoholysis product of cottonseed oil and oxyethylated sorbitol containing about 2 mols of cottonseed oil and about 6 mols of ethylene oxide per mol of sorbitol. The permeability of the core before water blocking was 4.0 mds. After water blocking with brine it was 0.4 md. After flushing with 10 pore volumes of the described treating solution in which the Atpet 931 had an opportunity to become hydrated, the permeability was only 0.3 md. Upon flushing with the $C_{10}$–$C_{12}$ fraction, however, to simulate the step of returning a well to production after a field treatment, the permeability rose to 1.0 mds. Obviously, the extensive hydration of the Atpet 931 greatly decreased its effectiveness as a waterblock removal agent compared to that shown in parent application S. N. 428,823, now U. S. Patent 2,779,418. This was probably due to the hydration increasing the water solubility of the agent beyond the optimum value. It will also be apparent that the oxyethylated nonyl phenols are unique in the limited effect of hydration on their operability as waterblock removal agents.

EXAMPLE V

An attempt was made to obtain a more optimum treating agent by vacuum distilling the reaction product of 1 mol of nonyl phenol with 4 mols of ethylene oxide. The distillation was carried out under a pressure of 5 to 6.5 mm. of mercury directly into a flask directly into a condenser to avoid decomposition as much as possible. At the end of the distillation the temperature rose to 281° C. Even before this temperature was reached decomposition was indicated by the yellow color of the distillate. An interfacial tension measurement was made for each cut. This measurement was made between the brine described in Example I and a solution of the cut in the $C_{10}$–$C_{12}$ fraction using various concentrations of each cut. The results are presented in Table V. Also presented in Table V are results of flow tests using the apparatus and technique described in Example I. The original permeability of the core before water blocking was 5.1 millidarcys. The permeability after blocking with the brine described in Example I was 0.4 millidarcys.

Table V

| Cut No. | Percent of Total | Mol Wt. | Interfacial Tension, dynes/cm. at Indicated Concentration | | | Permeability of Core, md. After Treatment |
|---|---|---|---|---|---|---|
| | | | 0.1 | 0.5 | 1.0 | |
| 1 | 7.6 | 368 | 11.1 | 0.05 | 0.05 | |
| 2 | 9.3 | 379 | 21.1 | 9.6 | 4.6 | 0.5 |
| 3 | 8.8 | 396 | 17.2 | 5.8 | 1.2 | |
| 4 | 8.1 | 404 | 22.2 | 11.4 | 6.9 | 0.5 |
| 5 | 7.8 | 484 | 9.1 | 9.4 | 0.1 | |
| 6 | 8.2 | 421 | 20.9 | 9.6 | 6.3 | 0.7 |
| 7 | 8.0 | 426 | 20.2 | 9.8 | 5.8 | |
| 8 | 7.9 | 426 | 19.0 | 8.5 | 4.2 | |
| 9 | 8.2 | 432 | 17.8 | 7.4 | 3.4 | |
| 10 | 8.0 | 439 | 16.6 | 5.7 | 1.7 | |
| 11 | 8.5 | 442 | 16.0 | 4.7 | 0.5 | |
| Residue | 7.8 | 798 | 2.3 | 0.05 | 0.05 | |
| Equal Parts, Cuts 2 to 11 | | | 18.8 | 7.3 | 2.5 | |
| Equal Parts, Cuts 1 to 11+Bottoms | | | 10.0 | 0.05 | 0.05 | |
| Original Material | | | 3.6 | 0.05 | 0.05 | |

Several points should be noted in Table V. First, the relatively ineffective nature of fairly pure cuts of the nonyl phenol reaction product with ethylene oxide is apparent. The original material produced very low interfacial tensions between oil and brine as noted in both Tables I and V, and also produced good permeability increases in flow tests, as shown in Figure 1. The poor interfacial tension reductions produced by the cuts were matched by poor increases in permeability in flow tests, as shown in Table V even though the molecular weights of the cuts were close to the 396 molecular weight for nonyl phenol reacted with 4 mols of ethylene oxide. Thus, the importance of a distribution of molecules having various amounts of ethylene oxide per mol of nonyl phenol is apparent. The importance of the mixture is further shown by the interfacial tension lowering abilities of blends of the cuts. In addition, it will be noted that cut No. 5 produced somewhat better interfacial tension reduction than the cut on either side. During the collection of cut No. 5 the flask "bumped" and considerable foam and liquid passed directly overhead from the flask without being distilled. The distribution of materials thus collected in cut No. 5 produced the high molecular weight and the improvement in ability to decrease interfacial tension observed for this cut.

EXAMPLE VI

The apparatus and technique described in Example I were used to test the waterblock removing ability of the reaction products of oleic acid with various amounts of ethylene oxide. Before water blocking, the core had a permeability of 8.0 millidarcys. After blocking with the brine described in Example I the core had a permeability of 0.3 millidarcy. The results of the test are presented in Table VI.

Table VI

| Mols Ethylene Oxide per Mol Oleic Acid | Permeability of Core, mds. After Treatment |
|---|---|
| 1 | 0.4 |
| 2 | 0.5 |
| 3 | 1.0 |
| 4 | 1.4 |
| After $C_{10}$–$C_{12}$ flush | 5.2 |

Similar tests were run using tall oil acids in place of oleic acid. The results are presented in Table VII. The permeability of the core in this case was 8.0 millidarcys before water blocking and was 1.1 millidarcys after blocking with the brine described in Example I.

Table VII

| Mols Ethylene Oxide per Tall Oil Acids | Permeability of Core, mds. After Treatment |
|---|---|
| 2 | 1.1 |
| 3 | 1.1 |
| 4 | 1.3 |
| 5 | 0.4 |
| After $C_{10}$–$C_{12}$ flush | 7.6 |

It will be apparent from the data in Tables VI and VII that the reaction products of ethylene oxide with oleic acid and tall oil acids are not as effective in giving an immediate increase in the permeability of a waterblocked formation as the reaction produced of ethylene oxide and nonyl phenol. Upon flushing with oil after treatment with the acid reaction products, however, the permeability increased considerably. Thus, while the optimum acid derivatives due to their delayed action cannot be considered at all equivalent to the nonyl phenol derivatives for field use, the acid derivatives are distinctly superior to other surface active agents, even to acid derivatives not having the correct ratio of ethylene oxide to acid.

I claim:

1. A method for treating an oil-bearing formation penetrated by a well comprising injecting into said well and then into said formation a solution of a surface active agent, said solution containing a major portion, by volume, of solvent for said surface active agent, and at least about 0.2 percent by weight of said surface active agent which comprises a mixture of compounds having the formula RLW in which R is an aralkyl hydrocarbon radical containing at least about 12 carbon atoms, L is an ether linkage, and W is a polyoxyethylene radical, said mixture containing compounds having polyoxyethylene radical lengths distributed throughout the range from 2 to about 6 oxyethylene groups per polyoxyethylene radical, and having an average length of polyoxyethylene radicals of from about 3.2 to about 4.5 oxyethylene groups.

2. A method for treating an oil-bearing formation penetrated by a well comprising injecting into said well and then into said formation a solution of a surface active agent, said solution containing a major portion, by volume, of solvent for said surface active agent, and at least about 0.2 percent by weight of said surface active agent which comprises the reaction product of from about 3.2 to about 4.5 mols of ethylene oxide with about one mol of a monohydric alkyl phenol having a hydrocarbon radical containing at least about 12 carbon atoms.

3. A method for treating an oil-bearing formation penetrated by a well comprising injecting into said well and then into said formation a solution of a surface active agent, said solution containing a major portion, by volume, of a solvent for said surface active agent, and at least about 0.2 percent by weight of said surface active agent which comprises the reaction product of from about 3.2 to about 4.5 mols of ethylene oxide with about one mol of nonyl phenol.

4. In the method of treating an oil-bearing formation penetrated by a well in which method a solution of a surface active agent is injected into said well and then into said formation, and in which the solvent for said surface active agent contains at least about 0.5 percent by volume of water, the improvement comprising using as said surface active agent a mixture of compounds having the formula RLW in which R is an aralkyl hydrocarbon radical containing at least about 12 carbon atoms, L is an ether linkage, and W is a polyoxyethylene radical, said mixture containing compounds having polyoxyethylene radical lengths distributed throughout the range from 2 to about 6 oxyethylene groups per polyoxyethylene radical, and having an average length of polyoxyethylene radicals of from about 3.2 to about 4.0 oxyethylene groups whereby the harmful effects of said water are avoided.

5. The method of claim 4 in which said surface active agent is the reaction product of from 3.2 to about 4.0 mols of ethylene oxide with about one mol of a monohydric alkyl phenol having a hydrocarbon radical containing at least about 12 carbon atoms.

6. The method of claim 4 in which said surface active agent is the reaction product of from about 3.2 to about 4.0 mols of ethylene oxide with about one mol of nonyl phenol.

7. A treating solution suitable for removing water from oil-bearing formations penetrated by a well comprising an oil solution containing a major portion of oil by volume, from about 0.5 to about 5 percent by volume of water, and at least about 0.2 percent by weight of a surface active agent comprising a mixture of compounds having the formula RLW in which R is an aralkyl hydrocarbon radical containing at least about 12 carbon atoms, L is an ether linkage, and W is a polyoxyethylene radical, said mixture containing compounds having polyoxyethylene radical length distributed throughout the range from 2 to about 6 oxyethylene groups per polyoxyethylene radical, and having an average length of polyoxyethylene radicals of from about 3.2 to about 4.0 oxyethylene groups, said water being present in an amount equal to at least about 10 percent of the volume of said surface active agent.

8. The treating solution of claim 7 in which said surface active agent is the reaction product of from about 3.2 to about 4.0 mols of ethylene oxide with about one mol of a monohydric alkyl phenol having a hydrocarbon radical containing at least about 12 carbon atoms.

9. The treating solution of claim 7 in which said surface active agent is the reaction product of from about 3.2 to about 4.0 mols of ethylene oxide with about one mol of nonyl phenol.

10. A treating compound for use in preparing a treating solution for removing water from oil-bearing formations penetrated by a well comprising about 100 parts by volume of a surface active agent, from about 10 to about 30 parts by volume of water and from about 10 to about 100 parts by volume of oil, said surface active agent comprising a mixture of compounds having the formula RLW in which R is an aralkyl hydrocarbon radical containing at least about 12 carbon atoms, L is an ether linkage, and W is a polyoxyethylene radical, said mixture containing compounds having polyoxyethylene radical lengths distributed throughout the range from 2 to about 6 oxyethylene groups per polyoxyethylene radical, and having an average length of polyoxyethylene radicals of from about 3.2 to about 4.0 oxyethylene groups.

11. The treating compound of claim 10 in which said surface active agent is the reaction product of from about 3.2 to about 4.0 mols of ethylene oxide with about one mol of a monohydric alkyl phenol having a hydrocarbon radical containing at least about 12 carbon atoms.

12. The treating compound of claim 10 in which said surface active agent is the reaction product of from about 3.2 to about 4.0 mols of ethylene oxide with about one mol of nonyl phenol.

13. A method for treating an oil-bearing formation penetrated by a well comprising injecting into said well and then into said formation two treating solutions in sequence, one treating solution being a solution containing a major portion of solvent by volume and from about 0.2 to about 1 percent by weight of a surface active agent comprising a mixture of compounds having the formula RLW in which R is an oil soluble portion selected from the group consisting of aliphatic and aralkyl hydrocarbon radicals containing at least about 12 carbon atoms, L is a connecting link selected from the group consisting of ester and ether linkages, and W is a polyoxyethylene radical, said mixture containing compounds having polyoxyethylene radical lengths distributed throughout the range from 2 to about 6 oxyethylene groups per polyoxyethylene radical, and having an average length of polyoxyethylene radicals of from 3.5 to about 5.0 oxyethylene groups, the other treating solution being a solution containing a major portion of solvent by volume, and at least about 0.2 percent by weight of a surface active agent comprising a mixture of compounds having the formula RLW in which R is an oil soluble portion selected from the group consisting of aliphatic and aralkyl hydrocarbon radicals containing at least about 12 carbon atoms, L is a connecting link selected from the group consisting of ester and ether linkages, and W is a polyoxyethylene radical, said mixture containing compounds having polyoxyethylene radical lengths distributed throughout the range from 2 to about 6 oxyethylene groups per polyoxyethylene radical, and having an average length of polyoxyethylene radicals from about 2.0 to 3.5 oxyethylene groups, the surface active agent in one treating solution having a different average length of polyoxyethylene radical from the average length of polyoxyethylene radical in the other treating solution.

14. The method of claim 13 in which one treating solution is an oil solution containing a major portion of oil by volume, and from about 0.2 percent to about 1 percent by weight of the reaction product of from 3.5 to about 5.0 mols of ethylene oxide with about one mol of an oil soluble organic chemical having a hydrocarbon radical containing at least about 12 carbon atoms, said organic chemical being selected from the group consisting of monohydric alkyl phenols and monobasic carboxylic acids, and the other treating solution is an oil solution containing a major portion of oil by volume, and at least about 0.2 percent by weight of the reaction product of from about 2.0 to 3.5 mols of ethylene oxide with about one mol of an oil soluble organic chemical having a hydrocarbon radical containing at least about 12 carbon atoms, said organic chemical being selected from the group consisting of monohydric alkyl phenols and monobasic carboxylic acids.

15. The method of claim 13 in which one treating solution is an oil solution containing a major portion of oil by volume, and from about 0.2 to about 1 percent by weight of the reaction product of from 3.5 to about 5.0 mols of ethylene oxide with about one mol of nonyl phenol, and the other treating solution is an oil solution containing a major portion of oil by volume, and at least about 0.2 percent by weight of the reaction product of from about 2.0 to about 3.5 mols of ethylene oxide with about one mol of nonyl phenol.

References Cited in the file of this patent

UNITED STATES PATENTS

| | | |
|---|---|---|
| 2,233,381 | De Groote | Feb. 25, 1941 |
| 2,465,237 | Larsen | Mar. 22, 1949 |
| 2,779,418 | Garst | Jan. 29, 1957 |

Disclaimer 2,851,105.—*Arthur W. Garst*, Tulsa, Okla. METHOD FOR REMOVING WATER FROM OIL SANDS. Patent dated Sept. 9, 1958. Disclaimer filed July 10, 1961, by the assignee, *Pan American Petroleum Corporation*.

Hereby enters this disclaimer to claims 1, 2, 3, 13, 14, and 15 of said patent.
[*Official Gazette August 15, 1961.*]